PROTECTIVE APPARATUS FOR A SUPERCONDUCTIVE SWITCH
Filed Nov. 24, 1967
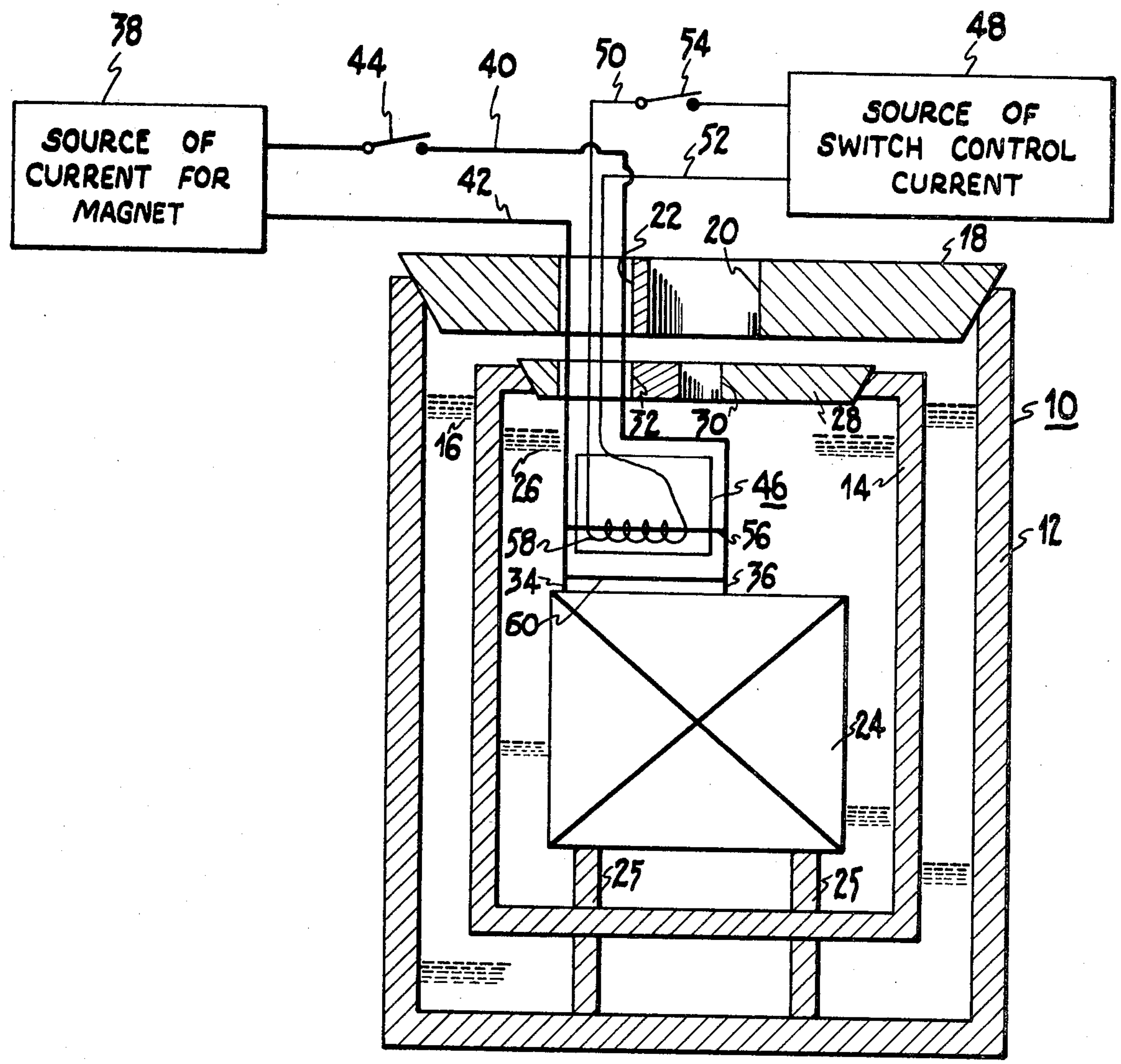
INVENTORS
HENRY C. SCHINDLER &
JAMES J. DRAUTMAN
BY Simon Yaffee
ATTORNEY 3,513,421
PROTECTIVE APPARATUS FOR A SUPERCONDUCTIVE SWITCH Henry Claude Schindler, East Brunswick, and James J. Drautman, Annandale, N.J., assignors to RCA Corporation, a corporation of Delaware Filed Nov. 24, 1967, Ser. No. 685,378
Int. Cl. H01f 7/22
U.S. Cl. 335—216 3 Claims

ABSTRACT OF THE DISCLOSURE

Means are disclosed to prevent destruction or damage to a superconductive switch connected across the terminals of a superconductive magnet in the event that the magnet becomes normal.

BACKGROUND OF THE INVENTION

This invention relates to superconductive magnets and particularly to means to protect a superconductive switch that is connected across the terminals of a superconductive magnet against destruction or damage when the field of the magnet collapses.

SUMMARY OF THE INVENTION

According to this invention, a shunting resistor of material that does not become superconducive is connected across the terminals of a superconducive switch which is itself connected across the terminals of the winding of a superconductive magnet. The shunting resistor may be placed in contact with the cooling fluid while the superconductor comprising a portion of the switch may be thermally insulated from the cooling fluid. When the energized magnet becomes normal, a large voltage which may be as high as several thousand volts, appears across the terminals of the magnet due to the collapse of the magnetic field of the magnet. The energy stored in the magnet is released and a large current flows through the superconductive switch and the normal shunt resistor in parallel. The switch becomes normal and therefore has resistance. In the absence of the shunting resistor, the high current passing through the switch may result in severe damage to the switch. When the shunting resistor is connected as described above, the current will divide between the now-normal switch and the shunt resistor in inverse proportion to the values of the normal resistance of the switch and the resistance of the shunting resistor, whereby sufficient energy will be shunted away from the switch so that it will not be damaged or destroyed. The shunt resistor being in contact with the cooling fluid may escape damage.

BRIEF DESCRIPTION OF THE DRAWING

The invention will be better understood upon reading the following specification in connection with the accompanying drawing in which the sole figure illustrates the protective device of this invention.

A Dewar flask 10 comprises an outer container 12 and an inner container 14. The space between the containers 12 and 14 may be filled with liquid nitrogen 16. A cover 18 may be provided to partially close the top of the container 12. The cover 18 may have two holes 20 and 22 therethrough. The liquid nitrogen 16 may be supplied to the container 12 through the hole 20, which also acts as a pressure relief opening, and supply and control wires may extend through the opening 22 as will be explained. A superconductive magnet 24 is positioned in the container 14. This magnet 24 may be spaced from the top and the sides of the container 14 and from the bottom of the container 14 as by spacers 25 whereby all parts of the magnet 24 are in contact with the liquid helium 26, with which the container 14 may be filled. A cover 28 may be provided for the top of the container 14, the cover 28 having a hole 30 therethrough for supplying liquid helium to the container 14, and also acting as a pressure relief for the container 14. The cover 28 may have another hole 32 therein for the aforesaid lead wires.

Current is supplied to the terminals 34 and 36 of the magnet 24 from a source 38 thereof by way of two conductors 40 and 42, a switch 44 being connected in series in the conductor 40. A superconductive switch 46 is connected across the terminals 34 and 36, and control current is fed to the switch 46 from a source 48 of control current by way of two conductors 50 and 52. A switch 54 may be connected in series with the conductor 50.

The superconductive switch 46 comprises a conductor 56 of material which becomes superconductive when sufficiently cold and means to make the conductor 56 normal when desired. This means to make the conductor 56 normal may include a heater 58 which is positioned in heat transfer relationship with the superconductor 56. In the use of the switch, the superconductor 56 is connected across the magnet terminals 34 and 36. The switch 56 will be closed, that is it will exhibit zero resistance, when the control current for the heater 58 is cut off as by opening the switch 54, whereby the heater 58 is not energized and the liquid helium 26 will cool the superconductor 56 to the temperature at which it is superconductive. To open the switch 46, the switch 54 is closed and the superconductor 56 is heated by the heater 58 to the point where the conductor 56 is normal, whereby it exhibits a resistance dependent on the length, thickness and material of the now normal superconductor and may be about 20 ohms.

The superconductive magnet apparatus as so far described is known and operates as follows: The switches 44 and 54 are closed. The superconductive switch 46 will exhibit its high resistance and current flow will be built up in the magnet 24 until the current in the magnet 24 reaches its desired value. At this time, the switch 54 is opened and as soon as the superconducting switch 46 cools to the point where it exhibits its zero resistance the source 38 is disconnected from the terminals 34 and 36, as by opening the switch 44, thus forming a superconducting loop.

Now if the magnet 24 goes normal its magnetic field will collapse producing a voltage across its terminals 34 and 36 that may be as high as in thousands of volts. This high voltage will cause the flow of a very high current in the superconductor 56 comprising the switch 46, and the superconductor 56 willl become normal and exhibit its high resistance. The current flowing in the now normal superconductor 56 will cause heating thereof great enough to destroy or damage the switch 46.

In accordance with this invention, a conductor 60 of material that will not become superconductive, such as stainless steel, having a predetermined resistance, one ohm being suitable, is connected across the terminals 34 and 36 and is positioned in contact with the liquid helium 26. When the superconductor magnet 24 becomes normal and the superconductor 56 of the switch 46 also becomes normal, then the resistance of the conductor 60 is low with respect to the resistance of the now normal superconductor 56 and the current divides between the now normal superconductor 56 and the conductor 60 in inverse proportion to their resistances, whereby the current flow through the switch 46 is reduced to the point where the switch 46 is not damaged. Since the conductor 60 is designed for this service and is cooled by the refrigerating bath, it is not damaged either.

Since modifications of this invention will occur to a person skilled in the art, the above description is to be taken as illustrative and not in a limiting sense.

What is claimed is:

1. In combination,
a superconductive magnet having at least a pair of terminals,
means for surrounding said magnet by a coolant to maintain said magnet superconducting,
a pair of conductors connected to said terminals for supplying current to said magnet,
a switch including a third conductor of superconductive material connected between said terminals and within said coolant, and
a fourth conductor of non-superconductive, normal material connected between said terminals and within said coolant,
said fourth conductor having a resistance of about one ohm which is low relative to the resistance of said third conductor when normal so that a current flow between said terminals upon said magnet becoming normal resulting in said third conductor becoming normal is divided between said third and fourth conductors in inverse proportion to their resistances.

2. In combination, a closed loop superconductive circuit, which includes a switching network which is serially connected with a superconductive magnet that is capable of assuming one of either a normal state or superconductive state;

said switching network including a first conductor capable of assuming one of either a superconducting state or a normal state, and a second conductor which can only assume a normal state,
said first and second conductors being connected in parallel;
said second conductor having a resistance which is less than the resistance of said first conductor when it is in the normal state by such an amount that when said magnet and first conductor go from the superconductive to normal state enough of the current thereby created in said circuit flows through said second conductor to protect said first conductor from damage, wherein said superconductive magnet includes a superconductive coil, portions of which are unshunted by external resistance.

3. The invention according to claim 2, wherein said second conductor is stainless steel.

References Cited

UNITED STATES PATENTS

| | | | |
|---|---|---|---|
| 3,150,291 | 9/1964 | Laquer | 335—216 XR |
| 3,263,133 | 7/1966 | Stekly | 335—216 XR |
| 3,278,808 | 10/1966 | Bonfeld | 335—216 XR |

GEORGE HARRIS, Primary Examiner

U.S. Cl. X.R.

200—166